United States Patent [19]
Blair

[11] Patent Number: 5,688,885
[45] Date of Patent: Nov. 18, 1997

US005688885A

[54] TETRAFLUOROETHYLENE TERPOLYMER

[75] Inventor: Leslie Mitchell Blair, Parkersburg, W. Va.

[73] Assignee: E. I. Du Pont de Nemours and Company, Wilmington, Del.

[21] Appl. No.: 678,919

[22] Filed: Jul. 12, 1996

Related U.S. Application Data

[60] Provisional application No. 60/002,410, Aug. 17, 1995.
[51] Int. Cl.$^6$ ................................................. C08F 214/26
[52] U.S. Cl. ............................................................. 526/247

[58] Field of Search ................................................ 526/247

[56] References Cited

FOREIGN PATENT DOCUMENTS

| 0117450 | 9/1984 | European Pat. Off. ............... 526/247 |
|---------|--------|----------------------------------------------|
| 0084874 | 5/1983 | Japan . |

*Primary Examiner*—Joseph L. Schofer
*Assistant Examiner*—N. Sarofin

[57] ABSTRACT

Copolymers of tetrafluoroethylene, hexafluoropropylene, and perfluoro(methyl vinyl ether) have excellent flex life.

4 Claims, No Drawings

TETRAFLUOROETHYLENE TERPOLYMER

RELATED APPLICATIONS

This application claims benefits of Provisional Application Serial No. 60/002,410, filed Aug. 17, 1995.

FIELD OF THE INVENTION

This invention is in the field of melt-fabricable copolymers of tetrafluoroethylene.

BACKGROUND OF THE INVENTION

Carlson in U.S. Pat. No. 4,029,868 discloses certain copolymers of tetrafluoroethylene (TFE), hexafluoropropylene (HFP), and either perfluoro(propyl vinyl ether) (PPVE) or perfluoro(ethyl vinyl ether) (PEVE) having a flex life approaching or surpassing that of TFE/HFP copolymers. HFP concentration for Carlson's polymers was stated to be 4–12 wt % corresponding to HFP index (HFPI, the infrared measure of HFP content) of about 0.9–2.7. It is also disclosed that use of perfluoro(methyl vinyl ether)(PMVE) in like amounts as PPVE or PEVE does not result in terpolymers of good flex life. Carlson's Comparison A shows that a terpolymer containing 3.8 wt % PMVE (HFPI=1.1) had MIT Flex Life of only 860 cycles, compared with 8,500 and 12,400 cycles for 0.8 wt % PPVE (HFPI=1.36) and 1.2 wt % PMVE (HFPI=1.0) terpolymers, respectively. On the basis of this comparison, Carlson noted that the perfluoromethyl perfluorovinyl ether terpolymer had grossly inferior toughness even though it had a higher termonomer content.

As is common in the field, Carlson based HFP content on measurement of HFPI. This quantity was introduced by Bro & Sandt in U.S. Pat. No. 2,946,763 which pertains to TFE/HFP copolymers. Bro & Sandt also introduced the multiplicative factor 4.5 to obtain HFP content in wt % from HFPI. While recent calibrations have led to different multiplicative factors, HFPI values deduced from infrared measurements at different times are generally regarded as reliable.

For use as wire insulation, it is important that an insulating material be resistant to stress cracking in order that insulation made from the material have good integrity over time in service. High flex life is an indicator of good stress cracking resistance.

SUMMARY OF THE INVENTION

Copolymers of tetrafluoroethylene, hexafluoropropylene, and perfluoro(methyl vinyl ether) having suitable combinations of hexafluoropropylene content and perfluoro(methyl vinyl ether) content have surprisingly good toughness as evidenced by flex life measurement. Thus, this invention provides a copolymer comprising tetrafluoroethylene, hexafluoropropylene in an amount corresponding to HFPI of from 1.9 to about 5.3, and an amount of perfluoro(methyl vinyl ether) effective to improve toughness, characterized by the copolymer exhibiting MIT Flex Life of at least 2000 cycles. Preferably, the amount of perfluoro(methyl vinyl ether) is in the range 0.5–5% by weight.

DETAILED DESCRIPTION OF THE INVENTION

It has been discovered that there are certain combinations of hexafluoropropylene (HFP), and perfluoro(methyl vinyl ether) (PMVE) in copolymers of tetrafluoroethylene (TFE) that are effective to provide surprisingly good flex life. Consequently, such copolymers are candidates for use in wire & cable applications requiring good resistance to stress cracking.

The TFE/HFP/PMVE copolymers of this invention have HFP content corresponding to HFPI=1.9–5.3, preferably HFPI=2.8–4.1. HFPI is determined by an infrared method outlined below.

The copolymers contain an amount of PMVE that is effective to improve toughness over the corresponding TFE/HFP dipolymer. Toughness is characterized herein by flex life, and copolymers of this invention generally have MIT Flex Life of at least 2000 cycles, preferably at least 4000 cycles. These flex life values indicate that articles fabricated from the TFE/HFP/PMVE copolymer resin would have adequate resistance to stress cracking, depending on the use. As is well known in the art, stress cracking or brittleness is very much dependent on the thickness of an article in use. Copolymer having higher MIT Flex Life should be used for better toughness in thicker sections, whereas copolymer having lower MIT Flex Life can have equivalent toughness in thinner sections. Such thinner sections are encountered, for example, in films, in small-diameter wire insulations, and in cell walls of foam structures.

In surprising contrast to Carlson's finding that a relatively large amount (3.8 wt %) of PMVE failed to provide acceptable flex life at low HFP content (HFPI=1.1), it has been found that, at higher HFPI, a smaller amount of PMVE can enhance toughness.

Generally, PMVE content is in the range 0.5–5 wt %, preferably 0.5–3 wt %. PMVE content in the copolymer is determined by an infrared method, also outlined below.

One skilled in the art will recognize that one or more additional copolymerizable monomers can be incorporated in the TFE/HFP/PMVE copolymers of this invention. The amount of such additional monomer will be such that the resultant copolymer remains partially crystalline, as indicated by detection of a melting endotherm by differential scanning calorimetry for resin as-polymerized, i.e., for resin that has not been previously melted.

Copolymers of this invention generally have melt viscosity (MV) in the range $0.5$–$50 \times 10^3$ Pa.s. MV in the range $1$–$10 \times 10^3$ Pa.s is preferred.

The TFE/HFP/PMVE copolymers of this invention can be made by any method of polymerization that yields generally homogeneous copolymer composition. Such methods include polymerization in aqueous media, polymerization in non-aqueous media, and polymerization in mixed media. Organic liquids used in the latter two polymerization systems commonly are halogenated compounds. In light of current environmental concerns about such compounds, aqueous dispersion polymerization is preferred. Such a process is disclosed, for example, for TFE/HFP/PPVE copolymer in SIR H130.

For aqueous polymerization, a broad range of temperatures can be used. Because of the low reactivity of HFP relative to that of TFE, higher temperatures are advantageous, such as temperatures in the range of about 95°–115° C. Temperature in the range 98°–108° C. is preferred for making the copolymers of this invention by the aqueous semibatch process used in the examples below. Surfactants used in emulsion polymerization appear to be less effective at temperatures above 103°–108° C. and there is a tendency to lose dispersion stability.

Surfactants suitable for use in dispersion polymerization of TFE/HFP copolymers can be used. Such surfactants include, for example, ammonium perfluorooctanoate (C-8), ammonium perfluorononanoate (C-9), and the perfluoroalkyl ethane sulfonic acids and salts thereof disclosed in U.S. Pat. No. 4,380,618.

Initiators commonly employed in emulsion polymerization of TFE copolymers are water-soluble free-radical initiators such as ammonium persulfate (APS), potassium persulfate (KPS), or disuccinic acid peroxide. APS and/or KPS is preferred.

After the reactor is charged with water, surfactant and monomers, heated to the chosen temperature, and agitation is started, a solution of initiator is added at a prescribed rate to initiate polymerization. A pressure drop is the usual indicator that polymerization has started. Then, TFE addition is started and controlled according to the scheme chosen to regulate the polymerization. An initiator solution, which can be the same as or different from the first initiator solution, is usually added throughout the reaction.

There are several alternatives for regulating the rate of TFE/HFP copolymerization, and these are applicable for polymerizing the TFE/HFP/PMVE copolymers of this invention. It is common with most alternatives first to precharge all HFP monomer and then to add TFE to the desired total pressure. Additional TFE is then added after initiator injection and reaction kickoff to maintain the chosen pressure. The TFE may be added at a constant rate, with agitator speed changed as necessary to increase or decrease actual polymerization rate and thus to maintain constant total pressure. Alternatively, the total pressure and the agitator speed may both be held constant, with TFE added as necessary to maintain the constant pressure. A third alternative is to carry out the polymerization in stages with variable agitator speed, but with steadily increasing TFE feed rates.

The HFP monomer is much less reactive than the TFE monomer so that the HFP/TFE ratio must be kept high to assure a high incorporation of HFP.

The PMVE can be incorporated into the copolymer by either pre-charge, pre-charge plus subsequent addition (pumping), or pumping of the PMVE into the reactor. The reactivity of PMVE relative to TFE is such that TFE/HFP/PMVE copolymer that is satisfactorily uniform with respect to PMVE incorporation can be obtained if PMVE is precharged to the reactor.

EXAMPLES

Fluoropolymer compositions were determined on 0.095–0.105 mm thick films pressed at 300° C., using Fourier transform infrared spectroscopy. For HFP determination, the method described in U.S. Pat. No. 4,380,618 was used. In applying this method, the absorbances of bands found at about 10.18 μm and at about 4.25 μm were used. HFP content is expressed as an HFP index (HFPI), the ratio of the 10.18 μm absorbance to the 4.25 μm absorbance. HFP content in wt % was calculated as 3.2×HFPI.

PMVE was determined from an infrared band at 11.24 μm. PMVE content in wt % was calculated as 8× the ratio of the 11.24 μm absorbance to 4.25 μm absorbance.

Melt viscosities of the fluoropolymers were determined by ASTM method D1238-52T modified as described in U.S. Pat. No. 4,380,618.

Thermal characteristics of fluoropolymer resins were determined by DSC by the method of ASTM D-4591-87. The melting temperature reported is the peak temperature of the endotherm on second melting.

Average size of polymer particles as polymerized, i.e., raw dispersion particle size (RDPS), was measured by photon correlation spectroscopy.

The standard MIT folding endurance tester described in ASTM D-2176 was used for determining flex life (MIT Flex Life). Measurements were made using compression-molded films that were quenched in cold water. Film thickness was 0.008±0.0005 inch (0.20±0.013 mm).

In the following, unless otherwise stated, stated solution concentrations are based on combined weight of solvent water and of solute(s). Stated concentrations of polymer solids in dispersions are based on combined weights of solids and aqueous medium, and were determined gravimetrically, i.e., by weighing dispersion, drying, and weighing dried solids, or by an established correlation of dispersion specific gravity with the gravimetric method.

Example 1

A cylindrical, horizontal, water-jacketed, paddle-stirred, stainless steel reactor having a length to diameter ratio of about 1.5 and a water capacity of 80 parts by weight was charged with 50 parts of demineralized water and 0.36 part of a 20 wt % solution of ammonium perfluorooctanoate surfactant (C-8, Fluorad® FC-143, 3M) in water. With the reactor piddle agitated at 35 rpm, the reactor was heated to 65° C., evacuated, purged with TFE, and evacuated again. The reactor temperature then was increased to 103° C., and 0.4 part of liquid PMVE was injected into the reactor. After the temperature had become steady at 103° C., HFP was added slowly to the reactor until the pressure was 436 psig (3.1 MPa). Then TFE was added to the reactor to achieve a final pressure of 600 psig (4.2 MPa). Then 0.39 part of a freshly prepared aqueous initiator solution containing 0.80 wt % of ammonium persulfate (APS) and 0.80 wt % potassium persulfate (KPS) was charged into the reactor at 0.1 part/min. Then, this same initiator solution was pumped into the reactor at 0.015 part/min for the remainder of the polymerization. After polymerization had begun as indicated by a 10 psig (0.07 MPa) drop in reactor pressure, additional TFE was added to the reactor to maintain pressure constant at 600 psig (4.2 MPa) until a total of 17.5 parts of TFE had been added to the reactor after kickoff. Total reaction time was 175 min with a TFE addition rate of 0.1 part/min. The reaction rate was maintained constant by adjusting the agitator speed. At the end of the reaction period, the TFE feed and the initiator feed were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. Solids content of the dispersion was 31.4 wt % and raw dispersion particle size (RDPS) was 0.167 μm. After mechanical coagulation, the polymer was isolated by compressing excess water from the wet polymer and then drying this polymer in a 150° C. convection air oven. The TFE/HFP/PMVE terpolymer had an MV of $2.31 \times 10^3$ Pa.s, an HFPI of 4.03 (12.9 wt % HFP), a PMVE content of 1.30 wt %, and a melting point of 248° C. This polymer was stabilized by heating at 360° C. for 1.5 hr in humid air containing 13 mol % water. A film molded of stabilized polymer then had an MIT Flex Life of 9200 cycles to break. In contrast, Example V of Bro & Sandt (U.S. Pat. No. 2,946,763) obtained a flex life of only 4500 cycles for a TFE/HFP dipolymer having MV=$1.2 \times 10^3$ Pa.s and HFPI=4.41, despite using a film only 0.005 inch (0.13 mm) thick. Generally, for films made from the same polymer, it is expected that a film 0.005 inch thick would have approximately twice the flex life of a film 0.008 inch thick. This comparison indicates the toughening effect of PMVE in the copolymers of this invention.

Examples 2-4

The procedure of Example 1 was essentially followed, except for differences noted in Table 1. The notation "nc" indicates no change from Example 1. Product properties are also summarized in the Table. The data show that PMVE terpolymers of this invention have excellent flex life. Examples 2 and 3 had MV and HFPI close to those properties of the TFE/HFP dipolymer in Example II of Bro & Sandt (MV=6.1×10³ Pa.s and HFPI=3.66) which had a flex life of only 5600 cycles despite the use of a thinner film. Example 4 had MV and HFPI close to those properties of the TFE/HFP dipolymer in Example I of Bro & Sandt (MV=7×10³ Pa.s and HFPI=3.4) which had a flex life of only 4500 cycles despite the use of a thinner film. These comparisons indicate the benefit of PMVE in the TFE/HFP/PMVE copolymers of this invention.

TABLE 1

Conditions and Results for Examples 2-4

| | Example: | | |
|---|---|---|---|
| | 2 | 3 | 4 |
| Run conditions: | | | |
| C-8 solution (part) | nc | 0.72 | nc |
| PMVE precharge (part) | 0.17 | 0.33 | 0.20 |
| HFP pressure (MPa) | nc | nc | 2.5 |
| Initiator pumping (part/min) | 0.012 | 0.011 | nc |
| Dispersion properties: | | | |
| Solids (wt %) | 27.7 | 31.7 | 25.4 |
| RDPS (μm) | 0.179 | 0.189 | 0.167 |

TABLE 1-continued

Conditions and Results for Examples 2-4

| | Example: | | |
|---|---|---|---|
| | 2 | 3 | 4 |
| Resin properties: | | | |
| MV (10³ Pa·s) | 6.40 | 6.73 | 8.44 |
| HFPI | 3.81 | 3.88 | 3.22 |
| HFP content (wt %) | 12.2 | 12.4 | 10.3 |
| PMVE content (wt %) | 0.58 | 1.06 | 0.89 |
| Melting point (°C.) | 243 | 247 | 251 |
| MIT Flex Life (cycles) | 14900 | 25000 | 9080 |

I claim:

1. A partially-crystalline copolymer comprising tetrafluoroethylene, hexafluoropropylene in an amount corresponding to HFPI of from 1.9 to about 5.3, and an amount of perfluoro(methyl vinyl ether) effective to improve toughness, characterized by the copolymer exhibiting MIT Flex Life of at least 2000 cycles.

2. The copolymer of claim 1, wherein the amount of said perfluoro(methyl vinyl ether) is from 0.5% to 5% by weight based on weight of total polymer.

3. The copolymer of claim 2, wherein said HFPI is from 2.8 to 4.1 and the amount of said perfluoro(methyl vinyl ether) is from 1% to 3% by weight.

4. The copolymer of claim 1, wherein said copolymer has a melt viscosity of no more than 10×10³ Pa.s.

* * * * *